Nov. 30, 1943.          W. VOIGTMANN          2,335,714
                        ELECTRIC CONDENSER
                        Filed Jan. 17, 1941
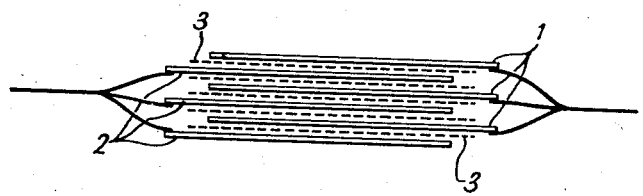
INVENTOR
WALTER VOIGTMANN
BY
ATTORNEY Patented Nov. 30, 1943

2,335,714

UNITED STATES PATENT OFFICE 2,335,714

ELECTRIC CONDENSER

Walter Voigtmann, Berlin, Germany; vested in the Alien Property Custodian

Application January 17, 1941, Serial No. 374,819
In Germany December 19, 1939

4 Claims. (Cl. 175—41)

This invention relates to a new and useful method of making condensers with an electrostatic layer forming a stratified condenser comprising a thin glass foil acting as the dielectric and having a thickness of 100 microns or less.

Electric condensers of the stratified or layered type are known in the art which have a dielectric consisting of relatively heavy layers of glass. These condensers inhere the drawback that the dielectric coats or layers often crack when subjected to the requisite compression so that the condenser becomes useless.

According to the invention this difficulty is avoided by using a layer of glass or foil of glass having a thickness preferably of less than 100 microns, such glass film being used in lieu of mica which is customarily employed in layered condensers. Such a thin layer of glass will withstand even the highest compressions, inasmuch as it is practically free from brittleness so much so that it will adapt itself to such irregularities as may exist.

The drawing illustrates an exemplified embodiment of the basic idea of the invention. What is here shown is a stratified condenser in which the coats are connected in parallel. All the metallic plates or coats of one polarity are denoted by 1, while those of opposite polarity are designated by 2. The dielectric material which consists of a tenuous foil of glass is shown by the dash lines and denoted by 3.

Another embodiment would be to form each dielectric by using a plurality of layers cemented together to further reduce the danger of the glass dielectric from cracking.

What is claimed is:

1. An electrostatic layer condenser capable of being subjected to high compression, comprising a plurality of metallic plates, each plate being alternately arranged with respect to another plate, and a dielectric of glass having a thickness of substantially one hundred microns interposed between said plates to form said condenser.

2. An electrostatic layer condenser capable of being subjected to high compression, comprising a plurality of metallic plates, each plate being alternately arranged with respect to another plate, and a dielectric of glass formed by a plurality of thin layers, said dielectric having a thickness of substantially one hundred microns interposed between said plates to form said condenser.

3. An electrostatic layer condenser capable of being subjected to high compression, comprising a plurality of metallic plates, each plate being alternately arranged with respect to another plate, a dielectric of glass formed by a plurality of thin layers joined together by cement, said dielectric having a thickness of approximately one hundred microns and interposed between said plates to form said condenser.

4. An electrostatic layer condenser capable of being subjected to high compression, comprising a plurality of metallic plates, each plate being alternately arranged in a group with respect to another group of plates, the plates of each group being connected together in parallel, and a dielectric of glass capable of withstanding high compression and having a thickness of approximately one hundred microns interposed between the plates of each group to form said condenser.

WALTER VOIGTMANN.